T. C. SIMONTON.
FILTER.

No 28,942. Patented June 26, 1860.

Witnesses:
J. W. Coombs
R. S. Spencer

Inventor:
T. C. Simonton
by Munn & Co
Attys

UNITED STATES PATENT OFFICE.

T. C. SIMONTON, OF PATERSON, NEW JERSEY, ASSIGNOR TO DE GRASSE B. FOWLER, OF SAME PLACE.

FILTER.

Specification of Letters Patent No. 28,942, dated June 26, 1860.

*To all whom it may concern:*

Be it known that I, T. C. SIMONTON, of Paterson, in the county of Passaic and State of New Jersey, have invented a new and Improved Filter; and I do hereby declare that the following is a full, clear, and exact description of the same, reference being had to the annexed drawings, making a part of this specification, in which—

Figure 1:
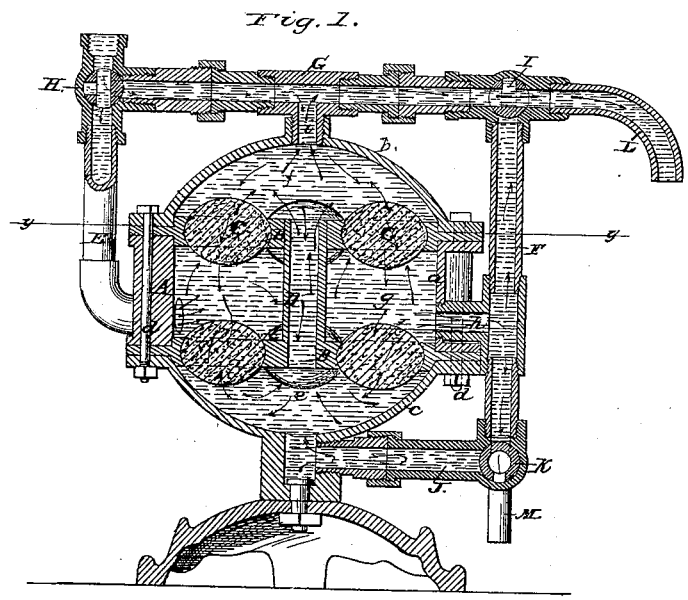
Figure 2:
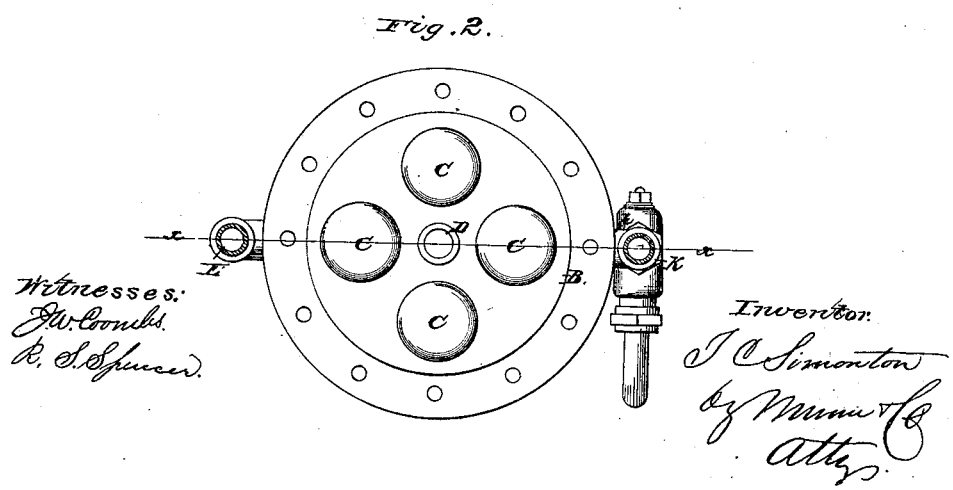

Figure 1 is a sectional elevation of my invention taken in the line $x$ $x$, Fig. 2. Fig. 2, a longitudinal section of the same taken in the line $y$, $y$, Fig. 1.

Similar letters of reference indicate corresponding parts in the two figures.

This invention relates to an improvement in that class of filters which are permanent fixtures, or, which require to be applied in such a manner to suit certain ends, that they cannot be reversed for the purpose of cleansing the filtering medium.

The within described invention is designed to be used with a filtering medium composed of carbon and gas tar treated with pressure and heat and baked in the presence of lime, as described in the patent of De Grasse B. Fowler, dated November 23, 1858, or other similar substance which will serve as a good filtering medium and bear the contact of melted metal.

The object of the invention is to obtain a filter by which the flow of the water through it may be reversed for cleansing purposes and at the same time the filtering medium snugly fitted in the filter.

To enable those skilled in the art to fully understand and construct my invention I will proceed to describe it.

A represents a cast metal case which is formed of a cylindrical body $a$, having a top $b$, and bottom $c$, secured to it by bolts $d$. The top and bottom $b$, $c$, of the filter are shells each being a section of a hollow sphere. B, B, are cast metal plates of circular form and secured within the filter by the bolts $d$, the edges of the plates B, being fitted between the body $a$, and the top and bottom thereof as shown clearly in Fig. 1.

In each plate B, a number of filtering mediums C, are fitted, as shown in Fig. 2, the mediums extending entirely through the plates as shown in Fig. 1. The two plates B, B, are connected by a tube D, and the plates divide the interior of the filter into three compartments $e$, $f$, $g$, the tube D, affording a communication between the upper and lower chambers $e$, $f$, as shown clearly in Fig. 1.

The central chamber $g$, has a pipe E, communicating with it at one side. This is the induction pipe. At the opposite side of said chamber $g$, a pipe F, is made to communicate by a short pipe $h$. The upper ends of the pipes E, F, are connected by a pipe G, and cocks H, I, are placed at the junction of the pipes G, E, F. The lower part of the channel $e$, has a pipe J, communicating with it the pipe J, intersecting the pipe F, at its lower end, a cock K, is at the junction of the two pipes F, J. The pipe G, is made to communicate with the upper chamber $f$, at about its center as shown at $i$, L, is a nozzle connected with the cock I, and M, a nozzle connected with cock K.

The operation is as follows: When the cock I, is turned so as to be closed with pipe F, and open with G, and the cock H, turned so as to be open with E, and closed with G, the water will pass down the pipe F, into the central chamber $g$, and pass through the mediums C, C, into the chambers $e$, $f$, see blue arrows. The water that passes into the lower chamber $e$, ascends within the tube D, into $f$, and the water is discharged in a filtered state from the nozzle L. In order to reverse the flow of the water the cock I, is turned so as to be open with pipe F, and closed with G, and the cock H, is turned so as to be open with G, and closed with E. The water then passes into pipe G, and from thence into chamber $f$, the water then passes through the filtering mediums C, in the upper plate B, into chamber $g$, and also through the tube D, into chamber $e$, and up through the mediums C, in the lower plate B, into chamber $g$, the water passing up pipe F, and discharge from nozzle L, see red arrows.

The fitting or securing of the filtering mediums C, in the plates B, is an important feature for it is essential that they be perfectly secured in their plates to prevent leakage and also to prevent their casual misplacement. In order to effect this result I employ as a filtering medium the composition treated in the manner set forth in the Letters Patent of De Grasse B. Fowler previously alluded to, or any other composition which will serve as a good filtering medium and not be affected by the contact of melted metal. The mediums are secured in the plates B, by casting the latter around them that is to say, the mediums C, are placed in the molds of the plates B, so that in casting the plates the melted metal will pass around the mediums and in cooling shrink to the same thereby firmly securing them in proper position. This is a very economical and secure mode of retaining the mediums C, in their plates B.

Having thus described my invention what I claim as new and desire to secure by Letters Patent is:

The placing of the tube D, and the plates B, B, containing the filtering mediums C, secured as described in the case A, as shown in connection with the pipes E, F, G, J, provided with the cocks H, I, K, communicating with the case and arranged relatively with the plates, or the compartments formed thereby, to operate as and for the purpose set forth.

T. C. SIMONTON.

Witnesses:
JNO. BENSEN,
JOHN R. BERDAN.